United States Patent
Zhang et al.

(10) Patent No.: US 10,161,269 B2
(45) Date of Patent: Dec. 25, 2018

(54) OUTPUT EFFICIENCY OPTIMIZATION IN PRODUCTION SYSTEMS

(71) Applicant: NEC Laboratories America, Inc., Princeton, NJ (US)

(72) Inventors: Kai Zhang, Monmouth Junction, NJ (US); Haifeng Chen, West Windsor, NJ (US); Kenji Yoshihira, Princeton Junction, NJ (US); Guofei Jiang, Princeton, NY (US)

(73) Assignee: NEC Corporation (JP)

( * ) Notice: Subject to any disclaimer, the term of this patent is extended or adjusted under 35 U.S.C. 154(b) by 213 days.

(21) Appl. No.: 15/211,191

(22) Filed: Jul. 15, 2016

(65) Prior Publication Data
US 2017/0016354 A1  Jan. 19, 2017

Related U.S. Application Data

(60) Provisional application No. 62/193,629, filed on Jul. 17, 2015.

(51) Int. Cl.
*G05B 13/02*    (2006.01)
*F01K 13/02*    (2006.01)
(Continued)

(52) U.S. Cl.
CPC ............ *F01K 13/02* (2013.01); *F01K 13/003* (2013.01); *G05B 13/048* (2013.01)

(58) Field of Classification Search
CPC .... G05B 13/048; G05B 13/042; G05B 11/42; G05B 13/024; G05B 13/0285; G05B 13/041; G05B 2219/31265; G05B 23/024
See application file for complete search history.

(56) References Cited

U.S. PATENT DOCUMENTS

| | | | | |
|---|---|---|---|---|
| 5,586,066 A | * | 12/1996 | White | G05B 23/024 700/80 |
| 2005/0149209 A1 | * | 7/2005 | Wojsznis | G05B 11/32 700/30 |

(Continued)

OTHER PUBLICATIONS

Alzohairy, T.A. et al., "Direct Adaptive Control of Unknown Nonlinear Systems Using Radial Basis Function Networks with Gradient Descent and K-means," International Journal of Computer Theory and Engineering, vol. 3, No. 6, Dec. 6, 2011. (pp. 1-10).

(Continued)

*Primary Examiner* — Darrin D Dunn
(74) *Attorney, Agent, or Firm* — Joseph Kolodka

(57) ABSTRACT

Systems and methods are provided for optimizing system output in production systems, comprising. The method includes separating, by a processor, one or more initial input variables into a plurality of output variables, the output variables including environmental variables and system response variables. The method also includes building, using the processor, a nonparametric estimation that determines a relationship between one or more initial control variables and the system response variables, and estimating a global input-output mapping function, using the determined relationship, and a range of the environmental variables. The method further includes generating one or more optimal control variables from the initial control variables by maximizing the input-output mapping function and the range of the environmental variables. The method additionally includes incorporating one or more of the optimal control variables into a production system to increase production output of the production system.

17 Claims, 5 Drawing Sheets

(51) Int. Cl.
*G05B 13/04* (2006.01)
*F01K 13/00* (2006.01)

(56) References Cited

U.S. PATENT DOCUMENTS

| | | | |
|---|---|---|---|
| 2005/0187643 A1* | 8/2005 | Sayyar-Rodsari ... | G05B 13/042 700/29 |
| 2008/0183311 A1* | 7/2008 | MacArthur ............ | G05B 17/02 700/29 |
| 2012/0283885 A1* | 11/2012 | Mannar ................ | G05B 23/024 700/286 |
| 2014/0058534 A1* | 2/2014 | Tiwari .................. | G05B 13/04 700/9 |
| 2014/0129491 A1* | 5/2014 | Sayyar-Rodsari ....... | G06N 3/02 706/12 |
| 2015/0051938 A1* | 2/2015 | Li .................... | G06Q 10/06314 705/7.24 |

OTHER PUBLICATIONS

Eguchi, T. et al. "An Adaptive Radius Adjusting Method for RBF Networks Considering Data Densities and Its Application to Plant Control Technology," ICROS-SICE International Joint Conference, Aug. 2009. (pp. 1-7).

Moreno, C. et al., "Improvements Through Process Adjustments," ASA 1999 Quality and Productivity Research Conference, May 1999. (pp. 1-14).

Moreno, C., "ULTRAMAX's Sequential Optimization vs. Neural Networks," 44th Annual ISA Power Industry Division conference, Jul. 2001. (pp. 1-9).

Eguchi, T. et al., A Plant Control Technology Using Reinforcement Learning Method with Automatic Reward Adjustment, IEEJ Transactions on Electronics Information and Systems, vol. 129. No. 7., Dec. 2008. (pp. 1-12).

* cited by examiner

OUTPUT EFFICIENCY OPTIMIZATION IN PRODUCTION SYSTEMS

RELATED APPLICATION INFORMATION

This application claims priority to provisional U.S. patent application No. 62/193,629, filed on Jul. 17, 2015, incorporated herein by reference in its entirety.

BACKGROUND

Technical Field

The present invention relates to system output optimization and, more particularly, to key performance indicator optimization in production systems.

Description of the Related Art

In many production systems (e.g., power plants, chemical plants, etc.), system output is determined by one or more controllable input variables. For example, in thermal power plants, the ingredient configurations of the input fuel (such as, e.g., coal, etc.) can largely affect the output efficiency of the thermal power plants. This output efficiency is usually calculated as the ratio between the electricity generated and the amount of fuel consumed. Therefore, an important goal for such a plant is to determine how to choose an input fuel with desired properties to improve system efficiency.

Besides such static input there are also dynamic control schemes that tune some variables during the production process. For example, in many production systems, operators need to tune parameters (such as, e.g., voltage, current rotation angle or certain components, etc.). How to determine a combination of such control variables to maximize the output quality (such as, e.g., a Key Performance Indicator (KPI) value) is thus of great interest to production management and optimizations.

SUMMARY

According to an aspect of the present principles, a method is provided for optimizing system output in production systems, comprising. The method includes separating, by a processor, one or more initial input variables into a plurality of output variables, the output variables including environmental variables and system response variables. The method also includes building, using the processor, a nonparametric estimation that determines a relationship between one or more initial control variables and the system response variables, and estimating a global input-output mapping function, using the determined relationship, and a range of the environmental variables. The method further includes generating one or more optimal control variables from the initial control variables by maximizing the input-output mapping function and the range of the environmental variables. The method additionally includes incorporating one or more of the optimal control variables into a production system to increase production output of the production system.

According to another aspect of the present principles, a system is provided for optimizing system output in production systems. The system includes a processor configured to: separate one or more initial input variables into a plurality of output variables, the output variables including environmental variables and system response variables; build a nonparametric estimation that determines a relationship between initial control variables and the system response variables; estimate a global input-output mapping function, using the determined relationship, and a range of the environmental variables; generate one or more optimal control variables from the initial control variables by maximizing the input-output mapping function and the range of the environmental variables; and incorporate one or more of the optimal control variables into a production system to increase production output of the production system. The system also includes a memory to store the one or more initial input variables, the one or more initial control variables, the plurality of output variables, and the one or more optimal control variables.

According to yet another aspect of the present principles, a non-transitory computer-readable storage medium including a computer-readable program for optimizing system output in production systems is provided, wherein the computer-readable program when executed on a computer causes the computer to perform the steps of: separating, by a processor, one or more initial input variables into a plurality of output variables, the output variables including environmental variables and system response variables; building, using the processor, a nonparametric estimation that determines a relationship between one or more initial control variables and the system response variables; estimating a global input-output mapping function, using the determined relationship, and a range of the environmental variables; generating one or more optimal control variables from the initial control variables by maximizing the input-output mapping function and the range of the environmental variables; and incorporating one or more of the optimal control variables into a production system to increase production output of the production system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
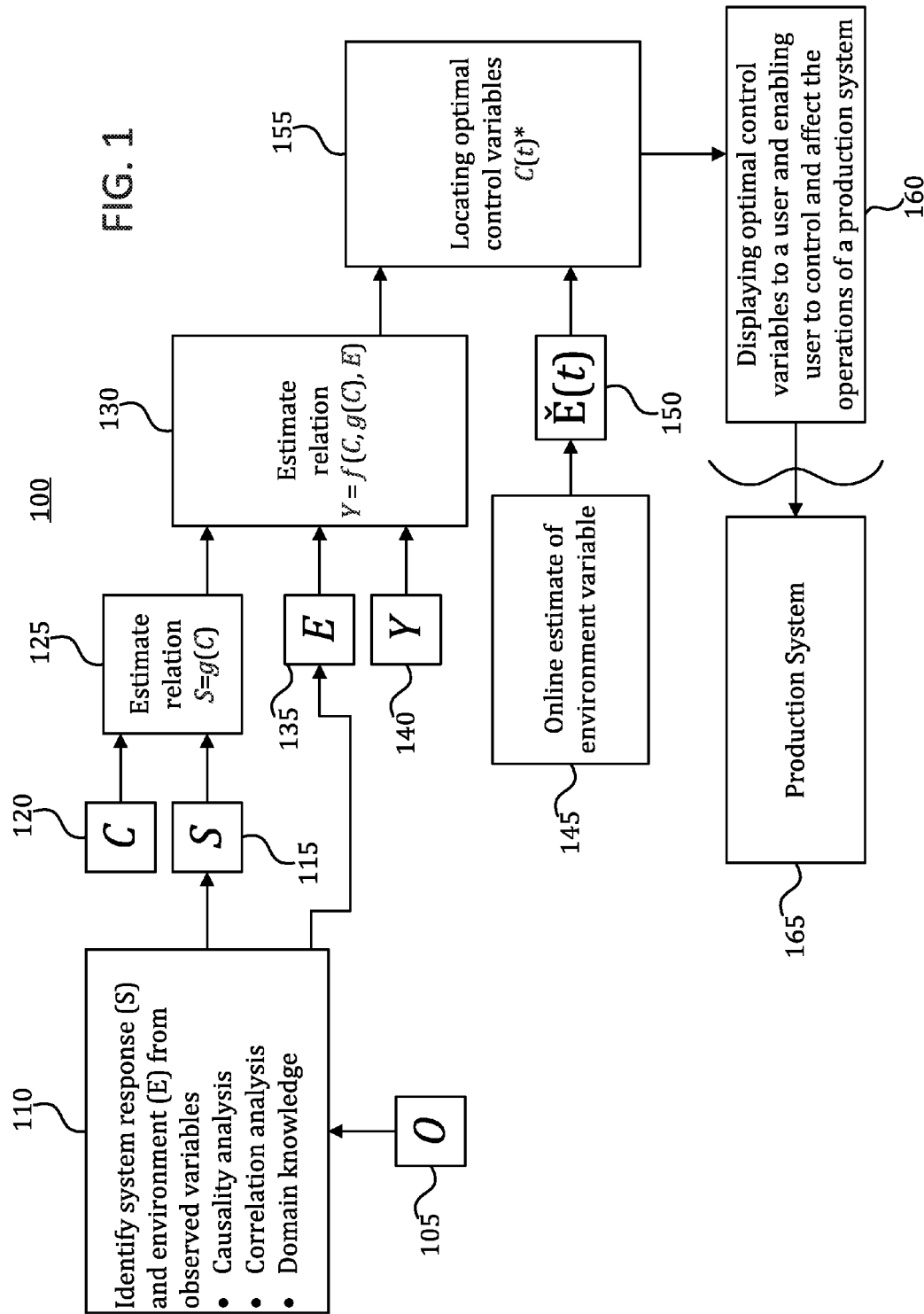
FIG. 1 is a high level block/flow diagram showing a system/method for performing Key Performance Indicator (KPI) optimization workflow, in accordance with the present principles.

In accordance with the present principles, systems and methods are provided for optimizing Key Performance Indicator (KPI) values in a production system by incorporating a nonparametric framework uses both variable dependencies and manifold regularization. These systems and methods can improve the quantity or quality of the output in production systems. As long as an objective can be clearly defined and measured, the provided systems and methods can be used to tune control variables to maximize the output KPI values.

Traditional methods typically use neural networks to estimate input and output mapping functions, which require tuning many parameters and can get stuck in a local optimal solution. According to an embodiment of the present principles, a manifold regularized kernel regression framework is used that can provide a global optimal solution. This method makes it more convenient to locate the control parameter in optimal KPI values. Furthermore, according to an embodiment of the present principles, data-driven, mathematical methods are used to separate variables that cannot be very well explained by the input variables, which can improve the online optimization.

In an embodiment, a nonparametric estimation is built that relates the input and output variables together. The relationship between the input and output variables takes into account the dependency structures of the input variables, either by a pre-discovery process or through domain knowledge. In an embodiment, observed variables are separated into output variables, wherein the output variables include system state variables and environment variables. The system state variables are dependent on control variables, and the environment variables are not affected by the control scheme but instead depend on a stimulus from the outside world.

In an embodiment, manifold regularization is added together with a loss function to estimate an input-output map.

In applications, according to an embodiment of the present principles, an online estimation of the environment variables is created. This input is plugged into the estimated relationship function and the optimal control variables are located under this condition.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high level block/flow diagram showing a system/method 100 for performing Key Performance Indicator (KPI) optimization workflow is illustratively depicted in accordance with an embodiment of the present principles.

System 100 is composed of elements 110, 115, 120, 125, 130, 135, 140, 145, 150, 155, and 160. In an embodiment, there are five major components of system 100: the variable separator 110, the first function estimator 125, the second function estimator 130, the online estimator 145, and the online optimizer 155.

In an embodiment, the variable separator 110 separates observed variables 105 (such as, e.g., time series) into output variables. The output variables are grouped into two sets of variables: environmental variables 135 and system response variables 115. The environmental variables 135 are variables that reflect some form of stimulus from the outside world and are incapable of being affected (either directly or indirectly) by the control variables 120. The system response variables 115 are variables that reflect the response of the system 100 under the control variables 120. In an embodiment, the system response variables 120 are those which are determined by a human input and the system 100 structure.

In an embodiment, the variable separator 110 separates the two sets of variables 115, 130 by determining correlations between the observed variables 105 and the controlled variables 120. In an embodiment, a nonparametric estimation is built by the variable separator 110 that relates the control variables 120 and the system response variables 115 together. The relationship between the control variables 120 and the system response variables 115 takes into account the dependency structures of the control variables 120, either by a pre-discovery process or through domain knowledge. In an embodiment, in order to determine the relationship between the control variables 120 and the system response variables 115, a kernel regression technique is used.

In an embodiment, a correlation analysis is performed. A Pearson product-moment correlation is calculated between every output variable and the control variable 120, and its absolute value is computed as the score. The correlation can be represented as:

$$\text{correlation}(x, y) = \left| \frac{\sum_{i=1}^{n} (x_i - \bar{x})(y_i - \bar{y})}{\sqrt{\sum_{i=1}^{n} (x_i - \bar{x})(x_i - \bar{x})} \sqrt{\sum_{i=1}^{n} (y_i - \bar{y})(y_i - \bar{y})}} \right|$$

where "x" is the output variable and "y" is the control variable 120. The correlation score for each of the output variables is compared against a threshold. Each output variable having a correlation score above the threshold is designated as a system response variable, and each output variable having a correlation score less than or equal to the threshold is designated as an environmental variable. After the correlation analysis is performed, the environmental variables 130 will have low correlations with the control variables 120 while the system response variables 115 will have higher correlations with the control variables 120. Note that in case one has multiple control variables, the score for each output variable will be the summation of its correlation with all the input variables.

In an embodiment, a causality analysis is performed to identify the two sets of variables 115, 130. The performance (prediction error) of using the input variables to predict the observed variables is examined. More and more control variables 120 are added for prediction. If more control variables result in a lower error during the prediction of an output variable, then the output variable is identified as a system response variable 115. Otherwise, if the addition of more control variables 120 results in an insignificant change in prediction error, according to a predefined threshold, the corresponding output variable is identified as an environmental variable 135.

During the causality analysis, the control variables 120 make the prediction accuracy higher on the system response variables 115, but do not make significant differences in predicting the environment variables 130.

In an embodiment, the first function estimator 125 determines a relationship between the control variables 120 and the system response variables 115. In an embodiment, the relationship is represented as the function S=g(C), where S is the system variable and g(C) is a function of the control variable, C.

In an embodiment, control variables 120, $C_i$, and system response variables 115, $S_i$, are provided for i=, 1, 2, ..., N. Using these variables, the following function is estimated:

$$g(C) = \sum_{i=1}^{N} \frac{\|C - C_i\|^2}{h} \alpha_i$$

wherein h is the bandwidth and each $\alpha_i$ is a coefficient of the model, which can be estimated by minimizing the following objective function:

$$\min_{\alpha} \sum_{i=1}^{N} (g(C_i) - Y_i)^2 - \gamma g' L g$$

wherein $$g = \begin{bmatrix} f_\alpha(x_1) \\ f_\alpha(x_2 \gamma) \\ \dots \end{bmatrix}$$

is a regularization parameter, and L is the Laplacian matrix on the pairwise similarity metric of the $C_i$'s.

In an embodiment, the second function estimator 130 estimates a global input-output mapping function, Y=ƒ(C, g(C), E), taking into account the function recovered in the first function estimator 125, wherein Y is the KPI value 140 and E is the environmental variable 135.

In an embodiment, control variables 120, $C_i$, the relationship provided by the first estimation module 125 (i.e., S=g(C)), the environmental variable 135, $E_i$, and the KPI values 140, $Y_i$, for i=1, 2, ..., N, are provided. Using these variables, the following function is estimated:

$$\min_{\alpha} \sum_{i=1}^{N} (f(C_i, g(C_i), E_i) - Y_i)^2 - \mu f' L f$$

wherein $$f = \begin{bmatrix} f(x_1) \\ f(x_2) \\ \dots \end{bmatrix},$$

μ is a regularization parameter, and L is the Laplacian matrix on the pairwise similarity matrix of the $C_i$'s and the $E_i$'s.

In an embodiment, the online estimator 145 estimates the range of the environmental variables 135.

In an embodiment, after the input-out mapping function, ƒ, is estimated, a gradient ascent method is used to determine the local optimal of the KPI values 140. The system uses the determined local optimal of the KPI values 140 to determine optimal control variables, C(t)*. The system 100 then provides recommended control variables 120 to a user via, e.g., a graphical user interface 160. According to an embodiment, the graphical user interface 160 enables a user to incorporate one or more of the optimal control variables, C(t)*, into the operations of a production system 165.

In an embodiment, the online optimizer 155 locates optimal control variables, C(t)*, by maximizing the function estimated in the second function estimator 130 as well as the value of the environmental variables 150 in the online estimator 145. Each KPI value 140 is associated with a state of the control variables 120. Namely, each KPI value 140 is the result of applying the function estimator 130 on a certain value/configuration of a set of control variables 120. The optimal control variable is determined by examining which control variable 120 value results in the maximum KPI value 140.

In an embodiment, one or more of the optimal control variables are incorporated into a production system 165 to enhance the ratio of output versus input of the production system 165. The production system 165 may be, e.g., a power plant, chemical plant, production factory, etc.

For example, in a thermal power plant, one or more control variables 120 are incorporated into the system 165 to, e.g., alter the ingredient configurations of the input fuel (such as, e.g., coal) to increase the output efficiency of the electricity produced versus the amount of fuel consumed.

Figure 2:
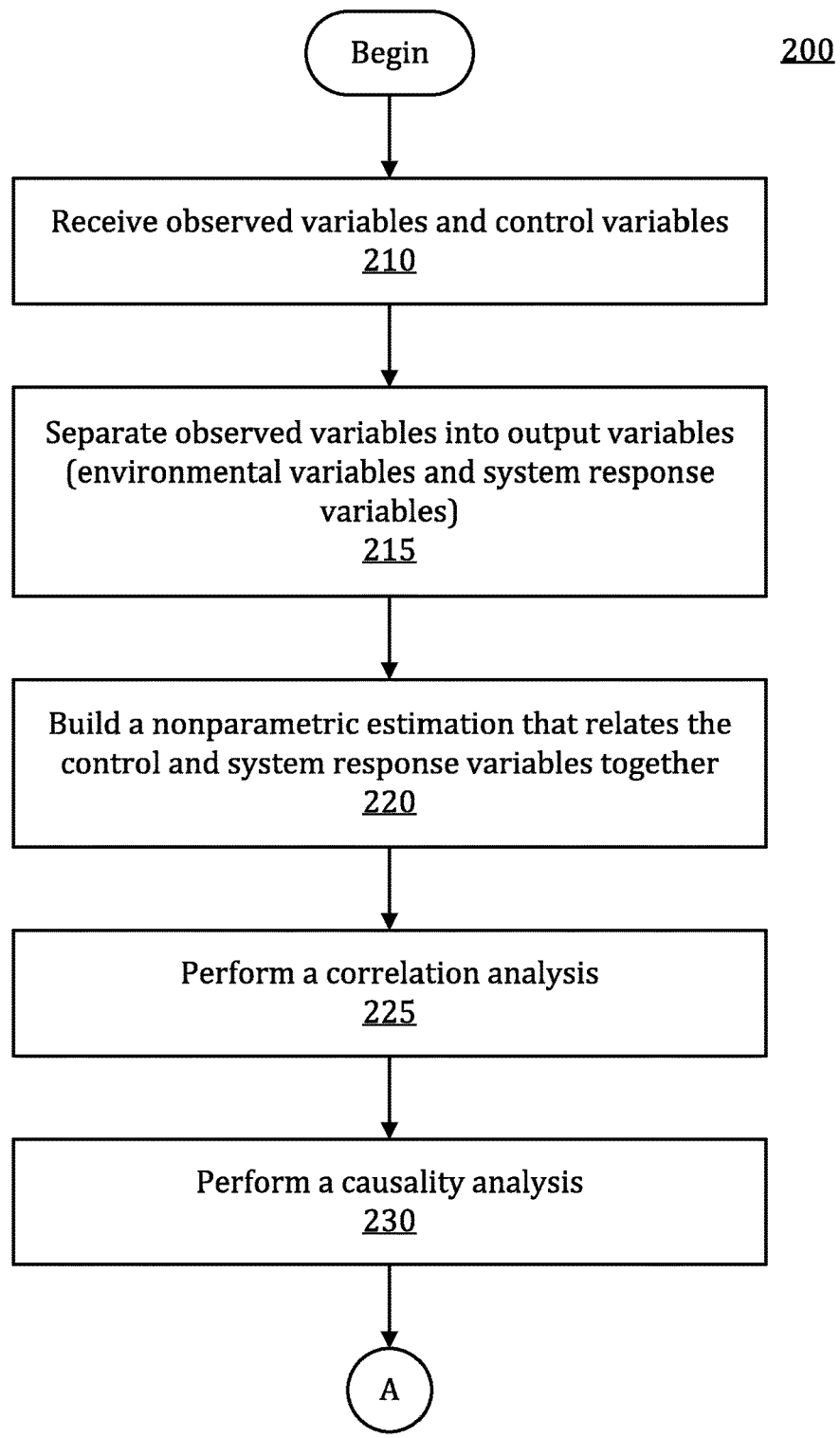
FIGS. 2-3 are a flow diagram illustrating a method for optimizing the KPI values for a system by a nonparametric framework, in accordance with the present principles.
Figure 3:
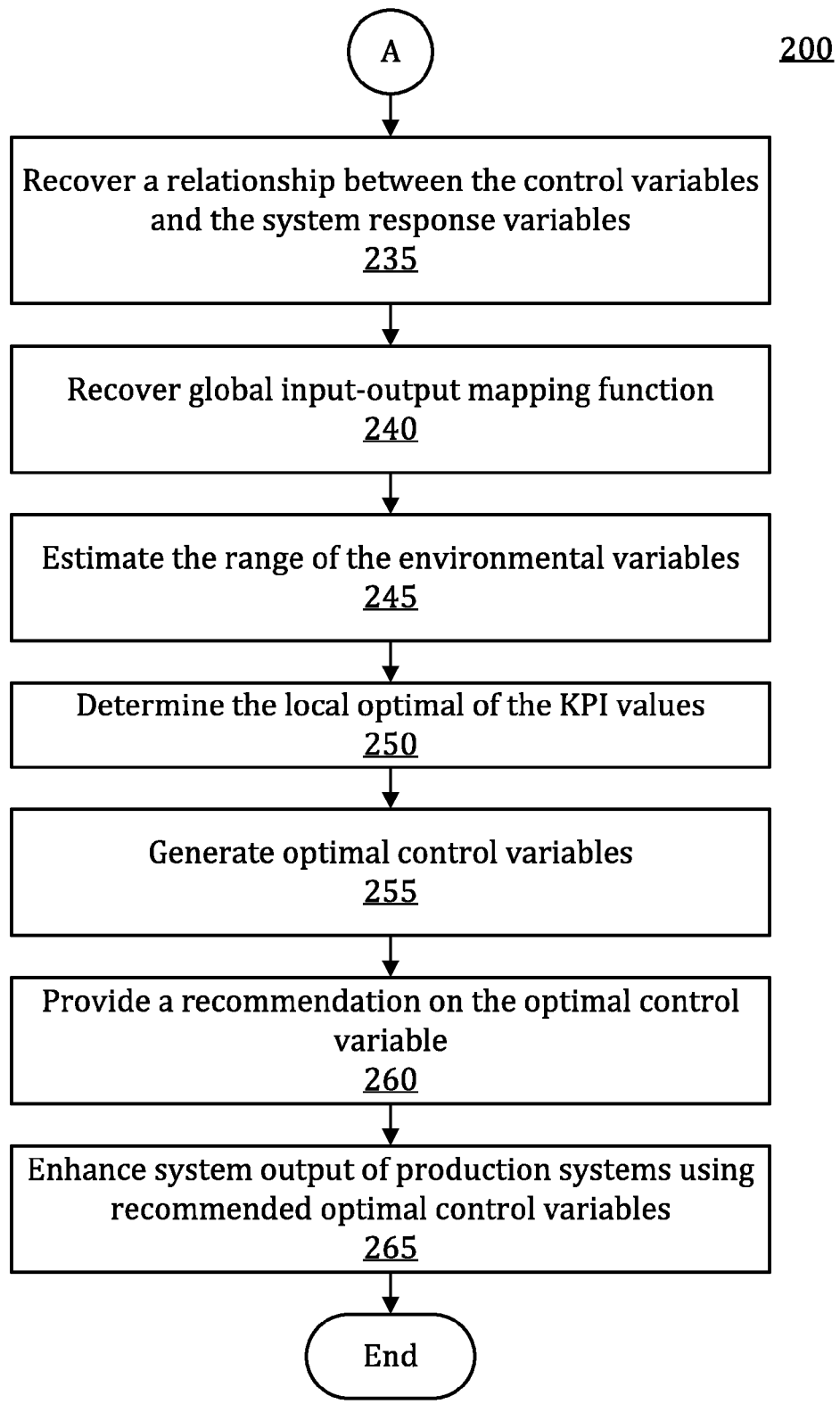

Referring now to FIGS. 2-3, a flow diagram of a method 200 for optimizing the KPI values for a system by a nonparametric framework is illustratively depicted in accordance with an embodiment of the present principles.

At 210, observed variables 105 and control variables 120 are received by the system 100.

At 215, the variable separator 110 separates the observed variables 120. In an embodiment, the observed variables 105, after separation, is grouped into two sets of variables: environmental variables 135 and system response variables 115. The environmental variables 135 are variables that reflect some form of stimulus from the outside world and are incapable of being affected (either directly or indirectly) by the control variables 120. The system response variables 115 are variables that reflect the response of the system 100 under the control variables 120. In an embodiment, the system response variables 120 are those which are determined by a human input and the system 100 structure. In an embodiment, the environmental variables are not controllable, while the system response variables are controllable. In an embodiment, separation of the non-controllable variables 135 reduces uncertainty in function estimation, which can improve the modeling power of the mapping function between control variables 120 and the output KPI variables 140.

In an embodiment, the two sets of variables 115, 130 are separated by determining correlations between the observed variables 105 and the controlled variables 120.

At 220, a nonparametric estimation is built by the variable separator 110 that relates the control variables 120 and the system response variables 115 together. The relationship takes into account the dependency structures of the input variables, either by a pre-discovery process or through domain knowledge.

At 225, a correlation analysis is performed. The environmental variables 130 may have low correlations with the control variables 120, while the system response variables 115 may have higher correlation with the control variables 120.

At 230, a causality analysis is performed to identify the two sets of variables 115, 130. During the causality analysis, the control variables 120 make the prediction accuracy higher on the system response variables 115, but do not make significant differences in predicting the environment variables 130. By identifying relevant and predictive variables for the target, and removing irrelevant features/variables, the estimation of the input-output mapping function is more accurate.

At 235, the first function estimator 125 recovers a relationship between the control variables 120 and the system response variables 115. In an embodiment, the relationship is represented as the function S=g(C), where S is the system variable and g(C) is a function of the control variable, C.

At 240, the second function estimator 130 recovers a global input-output mapping function, Y=ƒ(C, g(C), E), taking into account the function recovered in the first function estimator 125, wherein Y is the KPI value 140 and E is the environmental variable 135. By determining which control variables 120 can provide an optimal (highest) KPI value 140 in the input-out function mapping, the optimal control variable values can be determined. In an embodiment, this process relies on "hill climbing," namely starting from multiple initial choices of the control variable 120 values, and iterating along the gradient direction (the gradient is defined as the direction of maximum increase of the KPI value 140 with regard to the control variables 120 until reaching a local maximum point. Then, by comparing all of the local maximum values, the global optimal control variable 120 value can be chosen as the final optimal control variable.

In an embodiment, the control variables 120 ($C_i$), the relationship provided by the first estimation module 125 (i.e., S=g(C)), the environmental variable 135 ($E_i$), and the KPI values 140 ($Y_i$) for i=1, 2, . . . , N, are provided. Using these variables, the following function is estimated:

$$\min_\alpha \sum_{i=1}^{N} (f(C_i, g(C_i), E_i) - Y_i)^2 - \mu f' L f$$

wherein $$f = \begin{bmatrix} f(x_1) \\ f(x_2) \\ \ldots \end{bmatrix},$$

μ is a regularization parameter, and L is the Laplacian matrix on the pairwise similarity matrix of the $C_i$'s and the $E_i$'s.

At 245, the online estimator 145 estimates the range of the environmental variables 135 based on, e.g., the minimum and maximum of historical values of the environmental variables 135. The range of the environmental variables can be based on, e.g., historical records, prediction algorithms, domain knowledge, etc.

In an embodiment, the environmental variables 135 can be of the following forms: real time prediction and lower and upper bound (range) of each environmental variable 135.

At 250, after the input-out mapping function, ƒ, is estimated, a gradient ascent method is used to determine the local optimal of the KPI values 140. The system uses the determined local optimal of the KPI values 140 to generate optimal control variables, at 255.

At 260, the optimal control variables are recommended to a user via, e.g., a graphical user interface 160.

In an embodiment, the online optimizer 155 locates an optimal control variable, C(t)*, by maximizing the function estimated in the second function estimator 130 as well as the value of the environmental variables 150 in the online estimator 145.

The iterative gradient ascent can be defined as $x^{t+1} \leftarrow x^t + \eta \nabla f(x)$, wherein $\nabla f(x)$ is the gradient of the function ƒ(x) at point x. In an embodiment, to prevent the local optimal solution, the function is initialized from a randomly chosen different initial solution.

At 265, the recommended optimal control variables are incorporated into a production system 165 such as, e.g., a power plant, chemical plant, production factory, etc., to enhance the output of the production system 165 such as, e.g., increasing the output power versus input fuel.

In most production systems 165, system output is determined by some form of control variables 120. In an embodiment of the present principles, the recommended control variables are incorporated into such production systems 165 to enhance the ratio of output versus input of the production system 165. For example, in a thermal power plant, the recommended control variables are incorporated into the system 165 to, e.g., alter the ingredient configurations of the input fuel (such as, e.g., coal) to increase the output efficiency of the electricity produced versus the amount of fuel consumed.

Figure 4:
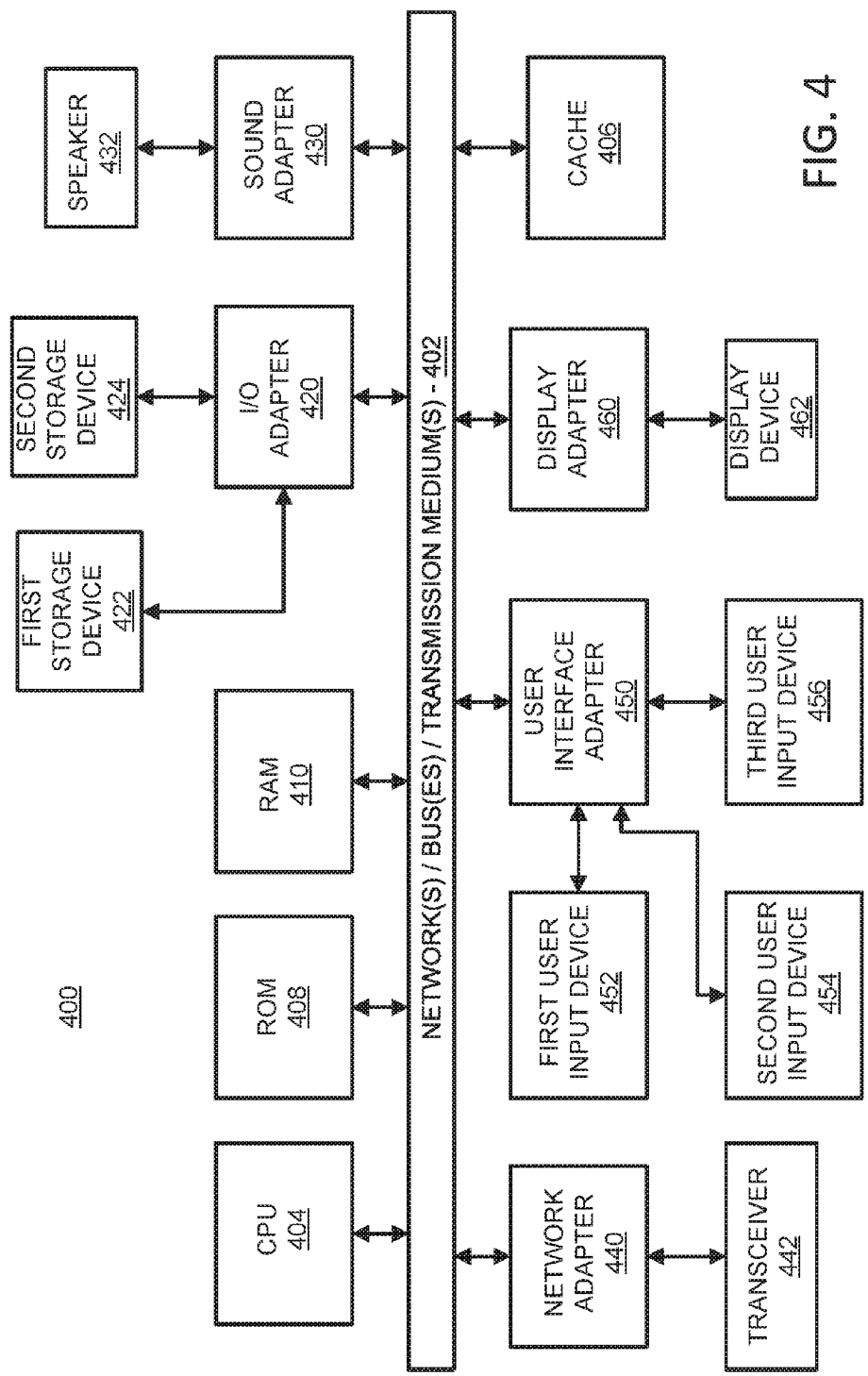
FIG. 4 is a block diagram illustrating an exemplary processing system to which the present principles may be applied, in accordance with an embodiment of the present principles.

Referring now to FIG. 4, an exemplary processing system 400, to which the present principles may be applied, is illustratively depicted in accordance with an embodiment of the present principles. The processing system 400 includes at least one processor (CPU) 404 operatively coupled to other components via one or more networks, buses, or transmission mediums 402, wherein the system bus 402 may be connected to any components via one or more wired or wireless networks such as, e.g., WiFi, Bluetooth, etc, and the one or more transmission mediums may include bounded transmission media, such as, e.g., coaxial cable, fiber optics, etc., and unbounded transmission media, such as, e.g., radio transmission, microwave transmission, etc. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 102.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. The user may use user input devices 452, 454, and 456 to incorporate the recommended control variables into the functionality of a production system 165. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Moreover, it is to be appreciated that system 100, described with respect to FIG. 1, is a high level block/flow diagram showing a system 100 and method for implementing respective embodiments of the present principles. Part or all of processing system 400 may be implemented in one or more of the elements of system 500 of FIG. 5.

Further, it is to be appreciated that processing system 400 may perform at least part of the methods described herein including, for example, at least part of method 200 of FIGS. 2-3. Similarly, part or all of system 500 of FIG. 5 may be used to perform at least part of the methods described herein including, for example, at least part of system 100 of FIG. 1, method 200 of FIGS. 2-3.

Figure 5:
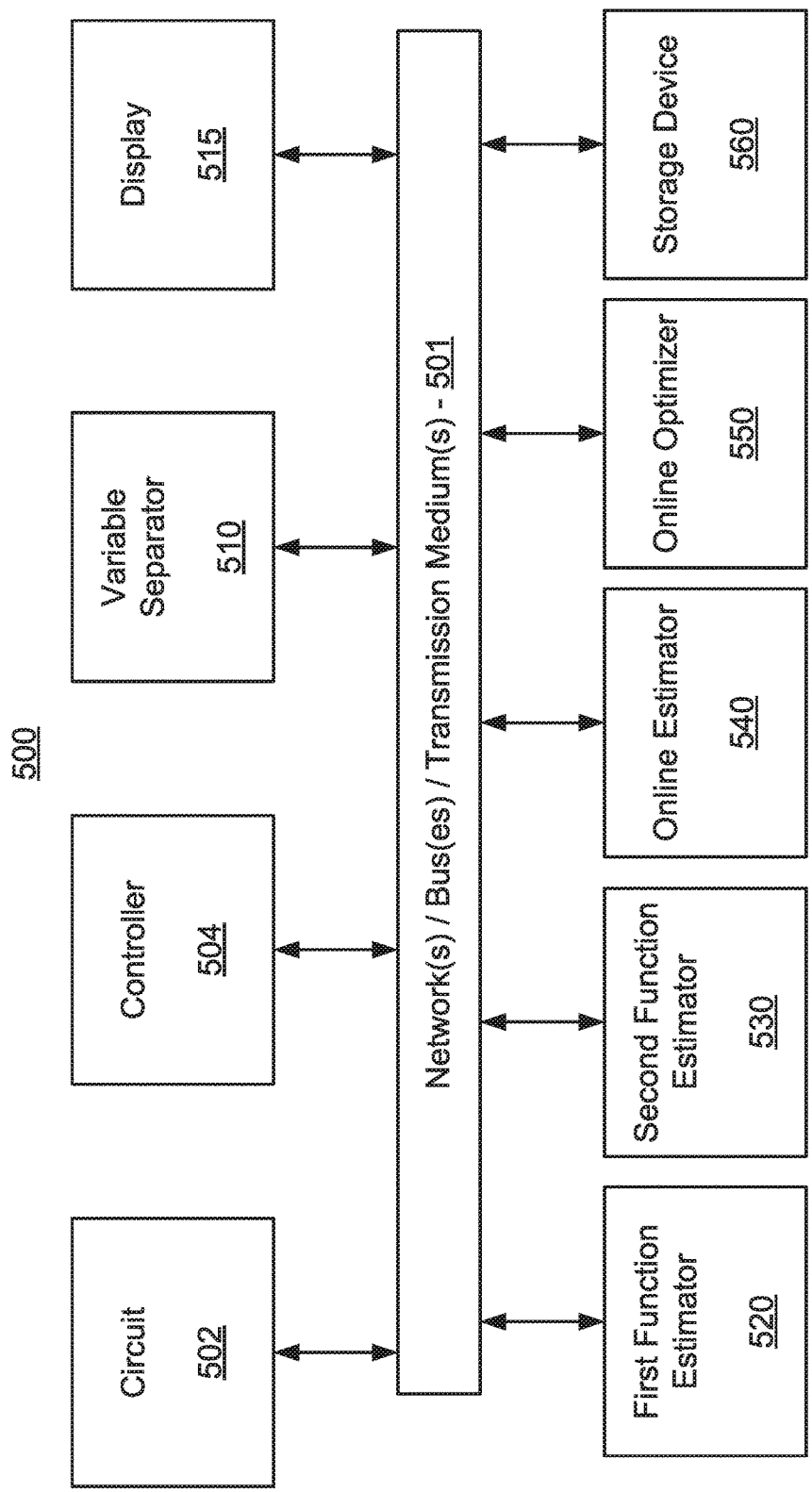
FIG. 5 is a block diagram illustrating an exemplary system for performing KPI optimization workflow, in accordance with an embodiment of the present principles.

Referring now to FIG. 5, an exemplary system 500 for performing KPI optimization workflow is illustratively depicted in accordance with an embodiment of the present principles.

While many aspects of system 500 are described in singular form for the sake of illustration and clarity, the same can be applied to multiple ones of the items mentioned with respect to the description of system 500. For example, while a single display 515 may be mentioned with respect to system 500, more than one display 515 can be used in accordance with the teachings of the present principles, while maintaining the spirit of the present principles. Moreover, it is appreciated that the display 515 is but one aspect involved with system 500 than can be extended to plural form while maintaining the spirit of the present principles.

In an embodiment, the system 500 may include a plurality of components, which may include one or more circuits 502, controllers 504, variable separators 510, displays 515, first function estimators 520, second function estimators 530, online estimators 540, online optimizers 550, and/or storage devices 560 (e.g., computer readable storage medium). The above components may be connected by, for example, one or more networks, buses, or transmission mediums 501, wherein the one or more networks may include one or more wired or wireless networks such as, e.g., WiFi, Bluetooth, etc, and the one or more transmission mediums may include bounded transmission media, such as, e.g., coaxial cable, fiber optics, etc., and unbounded transmission media, such as, e.g., radio transmission, microwave transmission, etc. Furthermore, data (e.g., system condition data, temperature, voltage, etc.) may be collected according to various embodiments of the present principles. The bus may be connected to any components via a wired or wireless connection.

In an embodiment, a variable separator 510 may be employed to separate and group observed variables 105 (such as, e.g., time series) into two sets of variables: environmental variables and system response variables. In an embodiment, the variable separator separates the two sets of variables by determining correlations between the observed variables and the controlled variables. In an embodiment, a nonparametric estimation is built by the variable separator 510 that relates the control variables 120 and the system response variables 115 together. The relationship takes into account the dependency structures of the control variables 120, either by a pre-discovery process or through domain knowledge.

At least one storage device 560 may be employed to store, e.g., the observed variables 105, the control variables 120, the environmental variables 135, the system response variables 125, the KPI values 140, etc.

In an embodiment, a first function estimator 520 recovers a relationship between the control variables and the system response variables. In an embodiment, the relationship is represented as the function S=g(C), where S is the system variable and g(C) is a function of the control variable, C.

In an embodiment, a second function estimator 530 recovers a global input-output mapping function, Y=f(C, g(C), E), taking into account the function recovered in the first function estimator 520, wherein Y is the KPI value and E is the environmental variable.

In an embodiment, an online estimator 540 estimates the range of the environmental variables. The range of the environmental variables can be based on, e.g., historical records, prediction algorithms, domain knowledge, etc.

In an embodiment, an online optimizer 550 locates an optimal control variable, C(t)*, by maximizing the function estimated in the second function estimator 530 as well as the value of the environmental variables in the online estimator 540.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for optimizing system output in production systems, comprising:
   separating, by a processor, one or more initial input variables into a plurality of output variables by performing a causality analysis to identify the output variables, the causality analysis includes increasing a number of control variables and performing a prediction analysis on the output variables, wherein, if increasing the number of control variables causes prediction error for an output variable to decrease, the output variable is designated as a system response variable, and, if increasing the number of control variables causes the prediction error for the output variable to change, according to a predefined threshold, the output variable is designated as an environmental variable, the output variables including environmental variables and system response variables;
   building, using the processor, a nonparametric estimation that determines a relationship between one or more initial control variables and the system response variables;
   estimating a global input-output mapping function, using the determined relationship, and a range of the environmental variables;
   generating one or more optimal control variables from the initial control variables by maximizing the input-output mapping function and the range of the environmental variables;
   incorporating one or more of the optimal control variables into a production system to increase production output of the production system; and
   controlling the production system utilizing the one or more optimal control variables to increase the output efficiency.

2. The method as recited in claim 1, further comprising:
   performing a correlation analysis to determine a correlation score for each or the output variables, wherein the correlation analysis includes:
      computing a Pearson product-moment correlation score between each of the output variables and the initial control variables;
      comparing the correlation score for each of the output variables against a threshold; and
      designating each output variable having a correlation score above the threshold a system response variable, and each output variable having a correlation score less than or equal to the threshold as an environmental variable.

3. The method as recited in claim 1, further comprising recommending the one or more optimal control variables to a user using a graphical user interface.

4. The method as recited in claim 1, wherein the range of the environmental variables is based on the group consisting of historical records, prediction algorithms, and domain knowledge.

5. The method as recited in claim 1, wherein the production system is a thermal power plant, and wherein incorporating one or more of the optimal control variables alters ingredient configurations of an input fuel in the thermal power plant, increasing an output efficiency of the thermal power plant.

6. The method as recited in claim 1, wherein the environmental variables represent an outside stimulus and are not affected by the initial input variables.

7. A system for optimizing system output in production systems, comprising:
   a processor configured to:
      separate one or more initial input variables into a plurality of output variables by performing a causality analysis to identify the output variables, the causality analysis includes increasing a number of control variables and performing a prediction analysis on the output variables, wherein, if increasing the number of control variables causes prediction error for an output variable to decrease, the output variable is designated as a system response variable, and, if increasing the number of control variables causes the prediction error for the output variable to change, according to a predefined threshold, the output variable is designated as an environmental variable, the output variables including environmental variables and system response variables;
      build a nonparametric estimation that determines a relationship between initial control variables and the system response variables;
      estimate a global input-output mapping function, using the determined relationship, and a range of the environmental variables;
      generate one or more optimal control variables from the initial control variables by maximizing the input-output mapping function and the range of the environmental variables; and
      incorporate one or more of the optimal control variables into a production system to increase production output of the production system;
   control the production system utilizing the one or more optimal control variables to increase the output efficiency; and
   a memory to store the one or more initial input variables, the one or more initial control variables, the plurality of output variables, and the one or more optimal control variables.

8. The system as recited in claim 7, wherein the processor is further configured to perform a correlation analysis to determine a correlation score for each or the output variables, wherein the correlation analysis includes:
   computing a Pearson product-moment correlation score between each of the output variables and the initial control variables;
   comparing the correlation score for each of the output variables against a threshold; and designating each output variable having a correlation score above the threshold a system response variable, and each output variable having a correlation score less than or equal to the threshold as an environmental variable.

9. The system as recited in claim 7, further comprising a graphical user interface configured to display the one or more optimal control variables to a user.

10. The system as recited in claim 7, wherein the range of the environmental variables is based on the group consisting of historical records, prediction algorithms, and domain knowledge.

11. The system as recited in claim 7, wherein the production system is a thermal power plant, and wherein the processor is further configured, when incorporating one or more of the optimal control variables, to alter ingredient configurations of an input fuel in the thermal power plant, increasing an output efficiency of the thermal power plant.

12. The system as recited in claim 7, wherein the environmental variables represent an outside stimulus and are not affected by the initial input variables.

13. The system as recited in claim 7, wherein the system response variables are determined by a human input and a structure of the system.

14. A non-transitory computer-readable storage medium including a computer-readable program for optimizing system output in production systems, wherein the computer-readable program when executed on a computer causes the computer to perform the steps of:

separating, by a processor, one or more initial input variables into a plurality of output variables by performing a causality analysis to identify the output variables, the causality analysis includes increasing a number of control variables and performing a prediction analysis on the output variables, wherein, if increasing the number of control variables causes prediction error for an output variable to decrease, the output variable is designated as a system response variable, and, if increasing the number of control variables causes the prediction error for the output variable to insignificantly change, according to a predefined threshold, the output variable is designated as an environmental variable, the output variables including environmental variables and system response variables;

building, using the processor, a nonparametric estimation that determines a relationship between one or more initial control variables and the system response variables;

estimating a global input-output mapping function, using the determined relationship, and a range of the environmental variables;

generating one or more optimal control variables from the initial control variables by maximizing the input-output mapping function and the range of the environmental variables;

incorporating one or more of the optimal control variables into a production system to increase production output of the production system; and controlling the production system utilizing the one or more optimal control variables to increase the output efficiency.

15. The computer-readable storage medium as recited in claim 14, wherein the computer-readable program when executed on a computer causes the computer to further perform the step of performing a correlation analysis, wherein the correlation analysis includes:

computing a Pearson product-moment correlation score between each of the output variables and the initial control variables;

comparing the correlation score for each of the output variables against a threshold; and designating each output variable having a correlation score above the threshold a system response variable, and each output variable having a correlation score less than or equal to the threshold as an environmental variable.

16. The computer-readable storage medium as recited in claim 14, wherein the range of the environmental variables is based on the group consisting of historical records, prediction algorithms, and domain knowledge.

17. The computer-readable storage medium as recited in claim 14, wherein the production system is a thermal power plant, and wherein incorporating one or more of the optimal control variables alters ingredient configurations of an input fuel in the thermal power plant, increasing an output efficiency of the thermal power plant.

* * * * *